(12) United States Patent
Richardson

(10) Patent No.: US 7,380,295 B2
(45) Date of Patent: Jun. 3, 2008

(54) BRIDGE BED BETWEEN ADJACENT SEATS

(76) Inventor: Robert Richardson, 1707 Somerset Pl., Apt. 3, Louisville, KY (US) 40220

( * ) Notice: Subject to any disclaimer, the term of this patent is extended or adjusted under 35 U.S.C. 154(b) by 9 days.

(21) Appl. No.: 11/457,975

(22) Filed: Jul. 17, 2006

(65) Prior Publication Data

US 2008/0010743 A1    Jan. 17, 2008

(51) Int. Cl.
    *A47C 17/80*    (2006.01)
(52) U.S. Cl. .............. 5/118; 296/190.02; 297/63
(58) Field of Classification Search ............ 5/118, 5/902; 297/63, 118; 296/190.02
    See application file for complete search history.

(56) References Cited

U.S. PATENT DOCUMENTS

| | | | |
|---|---|---|---|
| 1,620,346 A | 3/1927 | Harper | |
| 2,059,397 A * | 11/1936 | Robinson, Sr. | 297/63 |
| 3,353,194 A | 11/1967 | Matson | |
| 3,524,673 A | 8/1970 | Cramer et al. | |
| 3,880,458 A * | 4/1975 | Jackson | 296/164 |
| 3,910,626 A | 10/1975 | Hobbensiefken | |
| 4,005,898 A | 2/1977 | Way | |
| 4,232,413 A | 11/1980 | Mongault | |
| 4,443,034 A | 4/1984 | Beggs | |
| 4,487,451 A | 12/1984 | Fiorini | |
| 4,679,840 A | 7/1987 | Fry et al. | |
| 5,029,929 A | 7/1991 | Sjostrom et al. | |
| 5,170,521 A | 12/1992 | Light | |
| 5,181,286 A * | 1/1993 | McNulty | 5/8 |
| 5,505,513 A | 4/1996 | Carsner | |
| 5,787,522 A | 8/1998 | Swihart | |
| 6,470,517 B1 | 10/2002 | Kang | |
| 6,557,190 B2 | 5/2003 | Bailey | |
| 6,668,397 B2 | 12/2003 | Olenick et al. | |
| 6,711,762 B2 | 3/2004 | Olenick et al. | |
| 6,837,531 B2 | 1/2005 | Mack et al. | |
| 6,845,531 B2 * | 1/2005 | Kjellberg et al. | 5/118 |
| 6,929,306 B2 | 8/2005 | Mack et al. | |

* cited by examiner

*Primary Examiner*—Michael Trettel
(74) *Attorney, Agent, or Firm*—Robert R. Waters; Brian W. Foxworthy; Olen L. York, III

(57) ABSTRACT

A bed for use with two adjacent seats separated from each other so that a gap is defined therebetween, which may include adjacent seats within or outside of a vehicle. The bed comprises a body comprising a first end disposed on one of the passenger seats and a second end disposed on the other seat. The body bridges the gap defined between the seats. The bed may further include means for securing the body into a position relative to the seats, and/or means for securing the body about the back of at least one seat.

17 Claims, 4 Drawing Sheets

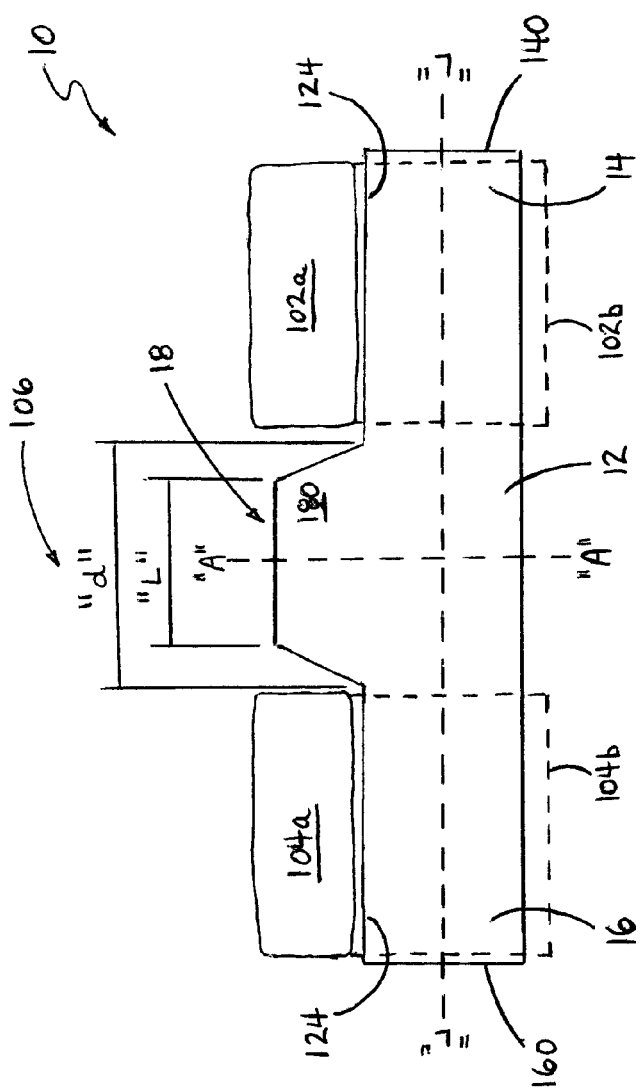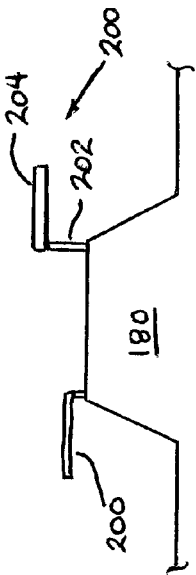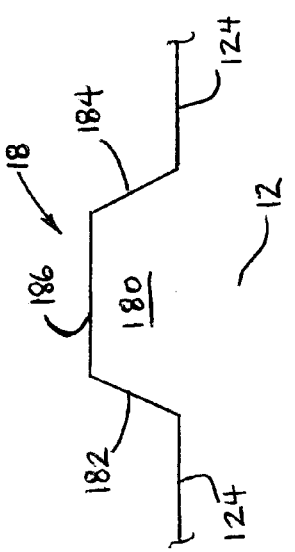
FIG. 1
FIG. 2
FIG. 3

BRIDGE BED BETWEEN ADJACENT SEATS

RELATED U.S. APPLICATION DATA

Not applicable.

BACKGROUND OF THE INVENTION

1. Field of the Invention

The present invention generally relates to portable beds for use outside the home, and in particular, relates to a bed operating as a bridge between two adjacent seats having a gap therebetween, such as the seats in the driving cab of a semi-tractor trailer or adjacently placed seats in a non-vehicle environment.

2. Description of the Related Art

There have been many attempts to provide alternative means to achieve comfortable and quality sleep in less than ideal circumstances. Commercial truck drivers, especially those that operate day-cab trucks, semi-tractor trailers, straight trucks or box trucks, among others, may need to maximize space utilization by sleeping along the adjacently spaced seats in the driving cab. For instance, day-cabs lack sleeping accommodations. However, the driver may have one or more passengers accompanying the driver, thus, the need to obviate crowding and/or sleeping issues may arise. In the other trucks mentioned, there is no space devoted to sleeping, thus the driver must improvise in order to avoid paying for a costly boarding for the evening.

Among the many relevant and related inventions drawn to providing sleeping apparatuses or devices for automobiles, the inventions disclosed in U.S. Pat. Nos. 3,524,673, 3,910,626 and 5,170,521 are considered typical of bed units that resemble cots or hammocks that are minimized for storage and sufficiently sturdy for use. Of particular relevance are U.S. Pat. Nos. 6,668,397 and 6,711,762, each issued to Olenick et al., which disclose the methods and apparatuses of various embodiments of truck cab bridge-beds. In particular, the references disclose a bed having a body with rods placed within a flexible platform having two layers. The rods reinforce the body during use. The bed includes a cushioning pad.

Other references considered related, but of lesser relevance, include apparatuses and devices that may be portable and/or compressible, but that operate in a less than satisfactory manner or are cumbersome to assemble or disassemble. Such apparatuses and devices include U.S. Pat. Nos. 1,620,346; 3,353,194; 4,005,898; 4,232,413; 4,679,840; and 6,470,517.

Additional references considered related include apparatuses and devices that operate as conversions of automobile components, and generally concern converting seats or storage apparatuses into a sleeping bunk. Included in this group of references are: U.S. Pat. Nos. 3,910,626; 4,443,034; 4,487,451; 5,029,929 5,505,513; 5,787,522 6,557,190; 6,837,531; and 6,929,306.

Although the list of inventions and references devoted to this general field of endeavor is significant, the aforementioned references suffer from several general deficiencies that are specifically overcome by the present invention. In particular, the aforementioned references fail to disclose the elements and features of the present invention, including the utilization of means for securing the body of the bed into a particular position relative to the seats, including the use of a nose extending from the body, arms, bands, legs, or the combination thereof, to inhibit displacement of the bed during use. Therefore, the present invention is patentably distinct over the prior art referenced in this application.

SUMMARY OF THE INVENTION

In one embodiment of the present invention, a bed is disclosed for use with two adjacent seats separated from each other so that a gap is defined therebetween, which may include adjacent seats within or outside of a vehicle. The bed comprises a body comprising a first end disposed on one of the passenger seats and a second end disposed on the other seat. The body bridges the gap defined between the seats. The bed may further include means for securing the body into a position relative to the seats, and/or means for securing the body about the back of at least one seat.

In a second embodiment of the present invention, a bed for a vehicle is disclosed, wherein the vehicle has two adjacent seats separated from each other so that a gap is defined therebetween, and wherein the bed comprises a body comprising a first end disposed on one of the passenger seats and a second end disposed on the other seat. The body bridges the gap defined between the seats. The body further includes a nose disposed between the first end and the second end, the nose comprising a horizontal length substantially corresponding to the distance between the upstanding backs of the seats, the nose longitudinally impinging the body between the seats.

In a third embodiment of the present invention, a bed for a vehicle is disclosed in substantial similarity to the embodiments disclosed above, and wherein the body further includes a cushioning pad disposed along the length and width of the body.

With regard to the second and third embodiments, respectively, it is envisioned that these embodiments may further include means for securing the body to at least one of the seats. Means may comprise at least one arm coupled to the nose of the body. The arm is selectively movable between a first position and a second position, wherein the arm serves to impede displacement of the body with respect to the seats. Alternatively, means may also comprise at least one returnably resilient band, wherein the at least one band is secured about the back of the seat. The at least one band may comprise a first end coupled to a second end.

It is envisioned that each of the aforementioned embodiments may include separately or in combination a cushioning pad disposed along the length and the width of the body, and/or a pillow element.

As discussed above, the device of the present invention overcomes the disadvantages inherent in the prior art devices. In this respect, before explaining at least one embodiment of the present invention in detail, it is to be understood that the invention is not limited in its application to the details of construction and to the arrangement of the components or elements set forth in the following description or as illustrated in the drawings. The invention is capable of other embodiments and of being practiced and carried out in various ways. Also, it is to be understood that the phraseology and terminology employed herein are for the purpose of description and should not be regarded as limiting the scope of the invention.

Accordingly, those skilled in the art will appreciate that the conception upon which this invention is based may readily be utilized as a basis for the design of other structures, methods, and systems for carrying out the purpose or purposes of the present invention. Therefore, it is important that the claims be regarded as including such equivalent constructions insofar as they do not depart from the spirit of the present invention.

Furthermore, the purpose of the foregoing "Abstract" is to enable the U.S. Pat. and Trademark Office and the public, generally, and especially including the practitioners in the art who are not familiar with patent or legal terms or phraseology, to determine quickly from a cursory inspection, the nature and essence of the technical disclosure of the application. The "Abstract" is neither intended to define the invention of the application, nor is it intended to be limiting to the scope of the invention in any way. It is intended that the application is defined by the claims appended to this application.

BRIEF DESCRIPTION OF THE DRAWINGS

Additional utility and features of the invention will become more fully apparent to those skilled in the art by reference to the following drawings, which illustrate the primary features of the preferred embodiment and numerous alternative embodiments.

FIG. 1 is a top view of a bed comprising a body that is placed onto seats having a gap therebetween;

FIG. 2 is a top view of the nose portion of the body;

FIG. 3 is a top view of the nose portion of the body having at least one arm;

DETAILED DESCRIPTION OF THE PREFERRED EMBODIMENT

Figure 4:
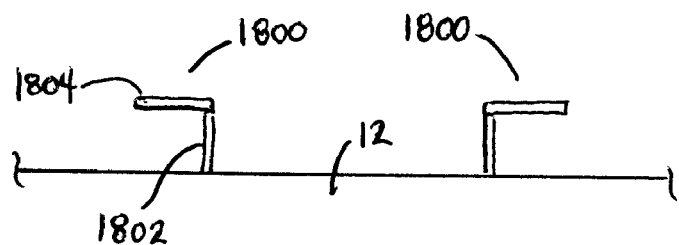
FIG. 4 is a top view of the longitudinal margin of the body having at least one arm along the length thereof.

The detailed description set forth below is for preferred embodiments and is intended to explain the present invention. It is to be understood that a variety of other arrangements are also possible without departing from the spirit and scope of the present invention.

In general, the present invention may be described as a bed for a vehicle in which the vehicle has two adjacent seats separated from each other so that a gap is defined and exists between the adjacent seats. The bed comprises a body that is oriented so as to traverse, span or bridge the gap between the adjacent seats and form a bed upon which a user could recline for stretching, temporary rest or sleep. The bed comprises a nose that is positioned in a manner so as to reside between the upstanding backs of the respective seats, and thus provide a means for inhibiting or reducing longitudinal movement of the bed during use. The bed may include other additional features, including cushioned padding through the bed, a pillow element, and means for placing and/or securing the bed to the seat(s) during use. Each of these elements and features will be more fully explained and disclosed in greater detail below.

Referring now to FIG. 1, a bed 10 for a vehicle 100 is disclosed in accordance with one embodiment of the present invention, wherein the vehicle 100 has two adjacent seats 102 and 104 separated from each other so that a gap 106 is defined therebetween. The bed 10 comprises a body 12 comprising a first end 14 disposed on one of the passenger seats 102 and a second end 16 disposed on the other seat 104. The body 12 bridges or traverses the gap 106 defined between the seats 102 and 104. The bed 10 may further include means 18 for placing, positioning or arranging the body 12 into a fixed position relative to the seats 102 and 104. Alternatively, the bed 10 may further include means 20 for securing the body 12 about the upstanding back 102a or 104a of at least one seat 102 or 104. The upstanding backs 102a and 104a are coupled to seat portions 102b and 104b, respectively. The bed 10 rests upon the seat portions 102b and 104b.

In one of the alternate embodiments of the present invention, a bed 10 comprising a body 12 substantially similar to that disclosed above comprising means 18 is disclosed. Means 18 may include a nose 180 disposed between the first end 14 and the second end 16. The nose 180 may be disposed intermediately between ends 14 and 16, and may be disposed in such a manner that the exterior margins 182 and 184 (see FIG. 2) of the nose 180 are each substantially equidistant from the margins 140 and 160 (see FIG. 1) of the respective ends 14 and 16, providing symmetry and uniformity to the body 12. Described in another manner, if an imaginary axis "A-A" was drawn through the central mid-line perpendicular to the longitudinal axis "L-L" of the body 12, thereby dividing the body 12 into two segments, each segment would be the mirror image of the other segment. The nose 180 comprises a longitudinal length "L" substantially corresponding to the distance "d" between the upstanding backs 102a and 104a of the seats 102 and 104, respectively. The nose 180 may be placed or arranged between the seats 102 and 104 so as to inhibit the longitudinal movement of the body 12 during use of the bed 10. It is envisioned that the nose 180 may be configured so as to impinge the body 12 from moving in a longitudinal manner once the nose 180 is placed between the backs 102a and 104a of the seats 102 and 104.

Figure 5:
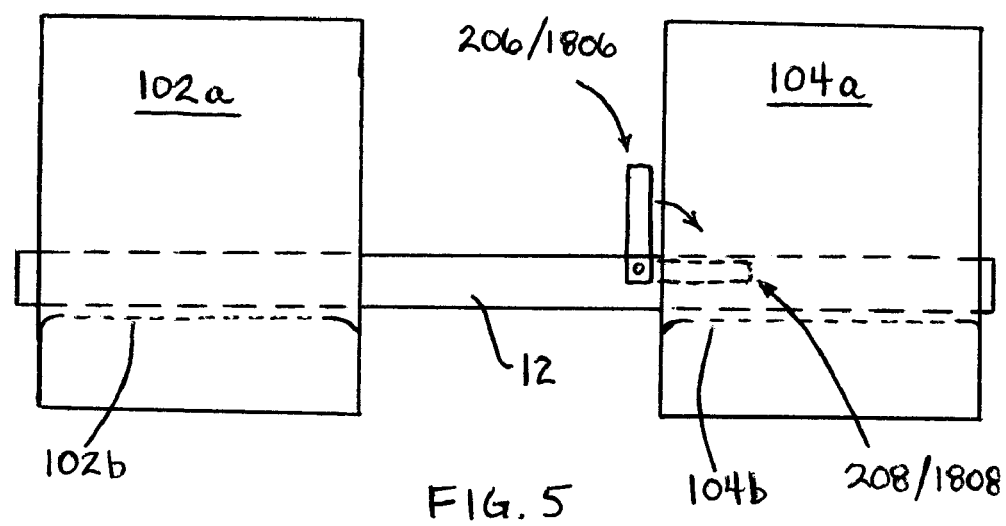
FIG. 5 is a side view of the bed having one arm that is pivotal between a first position and a second position, wherein the second position results in the arm closely adjacent to and potentially engaging the back of the seat to prevent movement of the bed.

As an alternative to the nose 180 presented above, and as depicted in FIG. 4, means 18 may include at least one arm 1800 coupled to the body 12 at a location(s) substantially corresponding to at least one of the two exterior margins 182 or 184 described above relative to the nose 180. In other words, the arm or arms 1800 utilized are coupled to the body 12 at a location(s) similar to the location(s) at which the exterior margins 182 and/or 184 engage the body 12. It is envisioned that each arm 1800 comprises a first member 1802 and a second member 1804, the first member 1802 and the second member 1804 oriented substantially perpendicular to one another and depending from one another. One of the members 1802 or 1804 is coupled to a longitudinal margin 122 or 124 of the body 12 (for reference, the laterally oriented margins perpendicular to the longitudinal margins are given the reference numerals 140 and 160, respectively). The other free member 1802 or 1804 is spaced from the longitudinal margin 122 or 124 via the coupled member 1802 or 1804 by a distance sufficient to accommodate a portion of the back 102a or 104a of the respective seat(s) 102 and/or 104. As depicted in FIG. 5, the coupled member 1802 or 1804 is movable (and depicted as having rotational motion when urged) about a pivotal axis from a first position 1806 to a second position 1808 and vice versa. As only one example, the first position 1806 may be characterized as a non-engaged or open position and the second position may be characterized as an engaged or closed position. In this example, the first (non-engaged or open) position 1806 is an orientation of the arm 1800 so that the body 12 is more freely movable to or from the seat 102 or 104, and the second (engaged or closed) position 1808 is an orientation of the arm 1800 so that the body 12 is inhibited from free movement to or from the seat 102 or 104.

Figure 6:
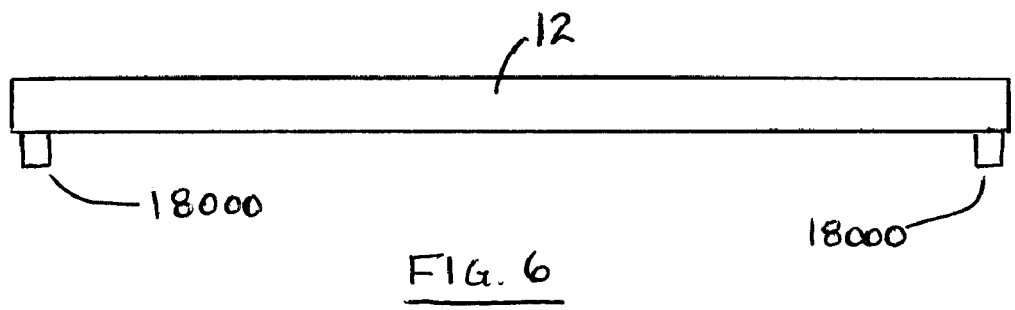
FIG. 6 is a side view of the bed having a pair of legs, wherein one leg is positioned adjacent one end of the body and the other leg positioned adjacent the opposite end of the body.
Figure 7:
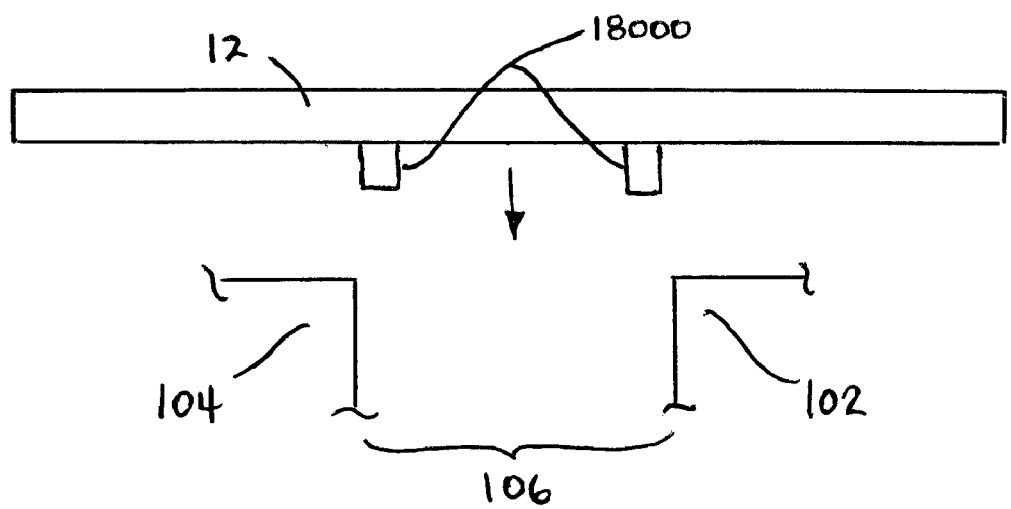
FIG. 7 is a side view of the bed in an alternate embodiment of FIG. 6, wherein the legs are spaced so as to substantially align within the gap between the seats 102 and 104.
Figure 8:
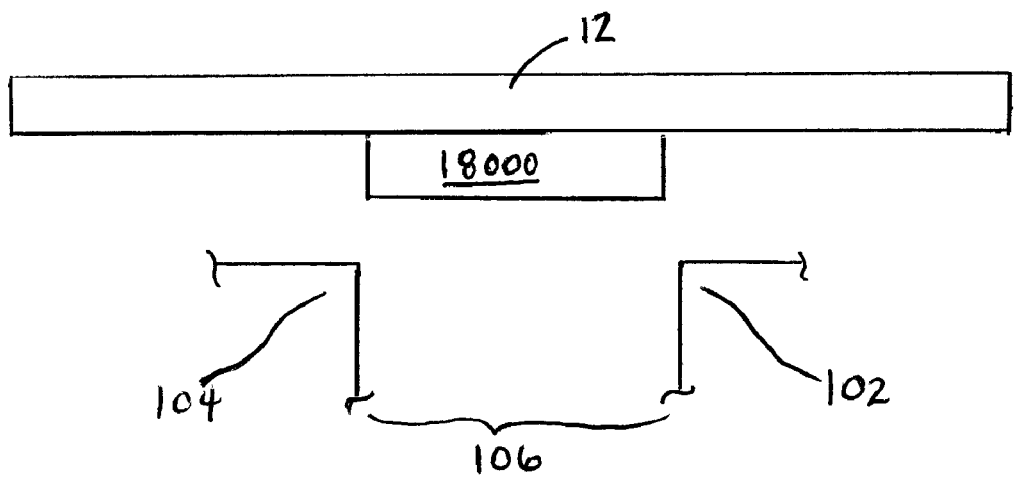
FIG. 8 is a side view of the bed in an alternate embodiment of FIG. 6 and FIG. 7, wherein a single leg is provided that has a dimension substantially similar in dimension to the gap defined between the seats 102 and 104.

In another alternate embodiment, and as a substitute for the nose 180 and the arm(s) 1800, at least one leg 18000 may be utilized on the underside of the body 12, or the side opposite the surface exposed to the user. It is envisioned that the leg(s) 18000 may be placed at either of the ends 14 or 16 (see FIG. 6), or intermediate to the ends 14 and 16 and insertable into the gap 106 formed between the seats 102 and 104 (see FIG. 7), or even comprising a single leg having a dimension corresponding to the length of the gap 106 formed between the seats 102 and 104 (see FIG. 8). It is envisioned that the leg(s) 18000 utilized in the embodiments depicted in FIG. 6, FIG. 7 and FIG. 8 may have dimensions of sufficient length and thickness to provide inhibition to the displacement generated during usage, especially when the user is moving about the bed 10 during sleep.

In another alternate embodiment of the present invention, a bed 10 comprising a body 12 comprising substantially similar to that disclosed above comprising means 20 is disclosed. Means 20 is utilized for securing the body 12 about the upstanding back 102a or 104a of at least one seat 102 or 104. It is envisioned that means 20 may include a variety of apparatuses or devices, including the use of at least one arm 200 (see FIG. 3), or alternatively at least one band 2000 (see FIG. 9), among other suitable apparatuses and devices, the details of which are provided below. The arm 200 utilized as means 20 is substantially similar to the arm(s) 1800 described above, with any distinctions or variations noted below.

As depicted in FIG. 3, each one of the arms 200 may be coupled to the nose 180 of the body 12, and it is envisioned that the arm(s) 200 is/are coupled to the nose 180 along a longitudinal margin 186 (substantially parallel to the longitudinal margin 124 of the body 12) and adjacent to the junction or engagement of margin 182 and margin 186 and/or the junction or engagement of margin 184 and margin 186, respectively. The arm 200 may comprise at least one free member 202 that is movable (and depicted as having rotation motion when urged) about a pivotal axis from a first position 206 and a second position 208 (see FIG. 5). The description utilized above in describing positions 1806 and 1808 are applicable to this example, as well, and thus, is incorporated by reference with substitution of the reference numeral 206 for 1806 and 208 for 1808, respectively, so that the first position 206 is a non-engaged or open position like 1806 and the second position 208 is an engaged or closed position like 1808. The arm 200 is selectively movable between a first position 206 and a second position 208 to impede displacement of the body 12 with respect to the seats 102 and 104. It is also envisioned that a coupled member 204 is depending from the free member 202, with the members 202 and 204 oriented substantially perpendicular to one another, and substantially similar to the description provided above with regard to members 1802 and 1804. The coupled member 204 is coupled to the body 12 in a manner substantially similar to that described above with regard to member 1804. In combination, the nose 180 and at least one arm 200 (oriented adjacent to the junction of margins 182 and 186 and/or margins 184 and 186) provide secure impingement against inadvertent displacement of the body 12 and bed 10 during use. In particular, the nose 180 would aid in inhibiting excessive longitudinal displacement and the arm(s) 200 would aid in inhibiting excessive lateral displacement (or the displacement perpendicular to the plane of the longitudinal displacement described).

Figure 9:
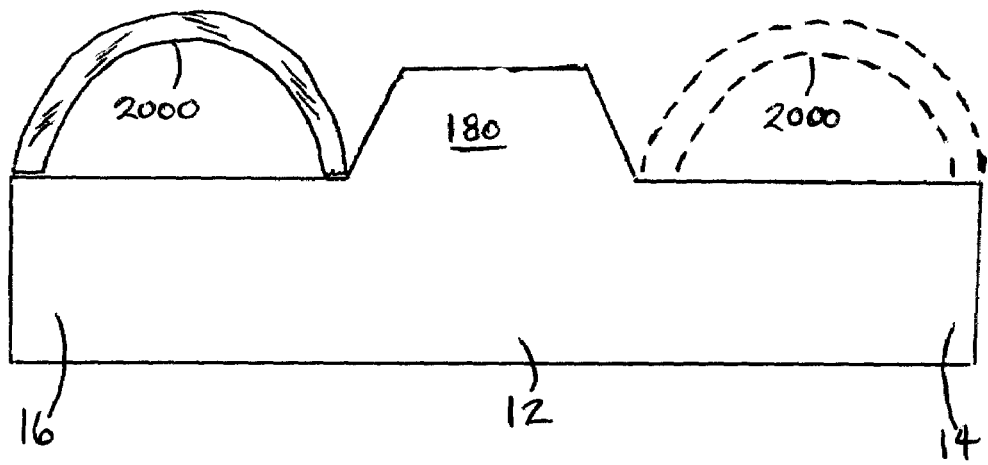
FIG. 9 is a top view of the bed and body, wherein a belt or band is provided for securing the bed about the back of a seat.
Figure 10:
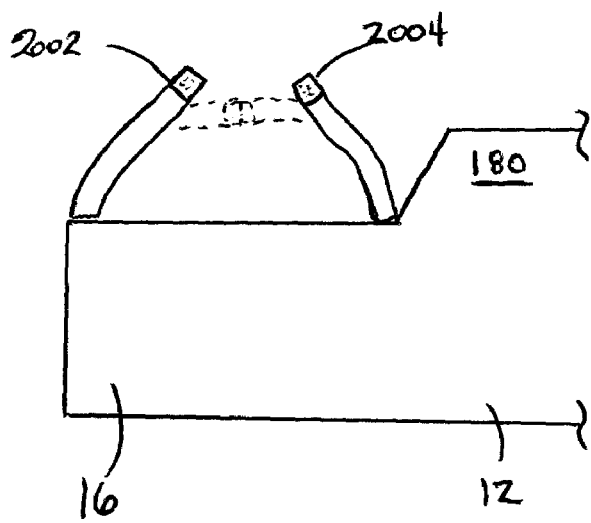
FIG. 10 is a side view of FIG. 9, wherein the belt or band has hook and loop material for securing two portions of a segmented band.

In another alternate embodiment, depicted in FIG. 9 and FIG. 10, respectively, as a substitute for the arm(s) 200 described above, means 20 may also comprise at least one returnably resilient band 2000, wherein each band 2000 is secured about the upstanding back 102a or 104a of the seat 102 or 104. Each band 2000 is manufactured from a material that is returnably resilient and/or elastic so as to elongate as necessary but return to initial form when the force is removed, and thus operating as a large elastic band for securing the body 12 to the seat(s) 102 and/or 104. Each band 2000 may comprise a first end 2002 coupled to a second end 2004. Coupling may be achieved by any number of means, including buttons, snap buttons, clips, belt and buckle, hook and loop and other suitable substitutes available.

Figure 11:
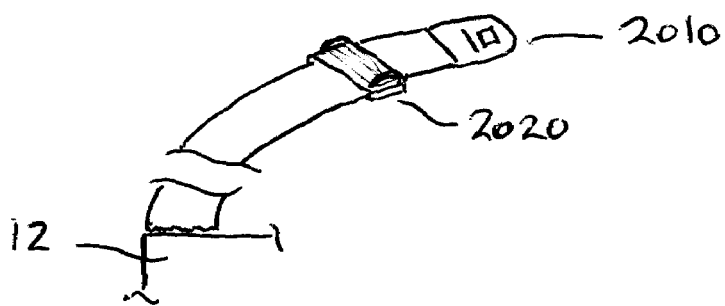
FIG. 11 is a top view of an alternate embodiment of the present invention wherein the belt or band includes a male buckle that is inserted into and removed from a female buckle apparatus of a conventional seat belt system provided in automobiles.

As depicted in FIG. 11, and as another alternate embodiment, means 20 may also comprise at least one belt or band 2000 having a male buckle 2010 insertable into and removable from the female buckle apparatus of a seat belt system utilized in motor vehicles. It is envisioned that multiple belts or bands 2000 having corresponding male buckles 2010 may be provided so that, for instance, each end 14 and 16 may have a separate belt or band 2000 with a male buckle 2010 for separately placing and/or securing the body 12 and bed 10 into place by inserting each male buckle 2010 into the corresponding female buckle apparatus provided by each seat 102 and 104 in the vehicle. The belt or band 2000 may include an adjustment mechanism 2020 for altering or adjusting the length of the belt or band 2000 in accordance with the needs of the user in placing or orienting the bed 10 to the seats 102 and 104.

It is further envisioned that the nose 180, the arm(s) 200 and/or 1800, the band(s) 2000 and/or leg(s) 18000 may be utilized separately or in various combinations to secure the bed 10 relative to the seats 102 and 104, including the use of each element so that a body 12 comprises a nose 180, at least one arm 1800 depending from the nose, and at least one leg 18000 depending from the underside of the body 12. Other variations include, but are not limited to, the use of at least one arm 200 and at least one leg 18000. Other such variations are envisioned and limited only by the combinations available.

Figure 12:
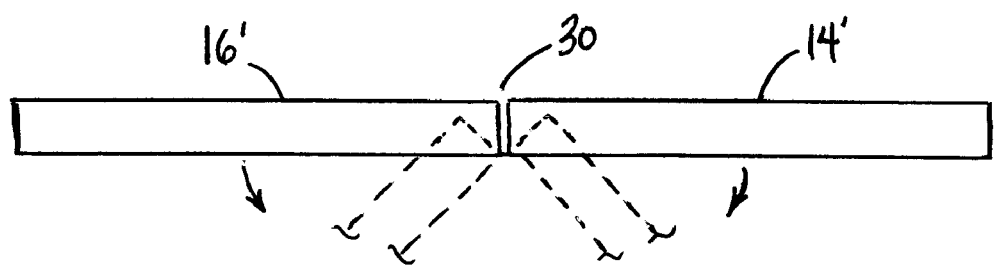
FIG. 12 is a side view of an alternate embodiment of the present invention, indicating that the bed (and more particularly, the body) is foldable about a margin for storage and/or transport.

As depicted in FIG. 12, the bed 10 may comprise a body 12 that may be folded for storage or transport from one place to another. The body 12 may be described as comprising a first body member 14' and a second body member 16' that may be folded about a margin 30 where the interior ends of the members 14' and 16' join when the body 12 is unfolded for use. As depicted, the margin 30 is biased to fold so that the surfaces of the members 14' and 16' (upon which the user reclines) fold outwardly and comprise the exterior surfaces of the body 12 when folded. Thus, when a user reclines on the unfolded body 12, the margin 30 resists folding.

Each of the aforementioned embodiments may further comprise a cushioning pad 22 disposed along the length and width of the body 12. The cushioning pad 22 may be a separate component or integral to the body 12. The pad 22 may be formed from a variety of materials, including returnably resilient foam, polystyrene, an air-filled chamber or other suitable substitutes. It is envisioned that the pad is a single piece or unit having a thickness of approximately 0.25 inches thick flexible polyurethane foam (FPF), and having a length and width substantially corresponding to the dimensions of the body 12. It is envisioned that any soft flexible material may be used instead of polyurethane, such as foam rubber, or any other flexible cushioning material that may be placed onto the body 12. In but one example, and not intended as a limitation on the scope of the invention, the body 12 comprises a length of approximately 48 inches, and a width of approximately 16 inches. In an embodiment that include the nose 180, the width from the margin 186 of nose 180 to the longitudinal margin 122 of body 12 is approximately 18 inches. However, it is envisioned that a variety of dimensions may be utilized. It is further envisioned that an extension or extensions may be utilized on the respective ends 14 and/or 16 to increase the length of the body 12 as space permits.

Figure 13:
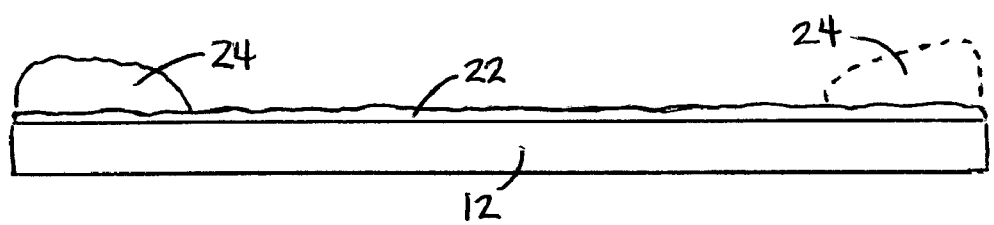
FIG. 13 is a side view of another embodiment disclosing pad and pillow(s).

As depicted in FIG. 13, it is further envisioned that the cushioning pad 22 may be fabricated in such a manner so that pad 22 is removable from the body 12 for laundering. Included in this embodiment is the use of a fabric and stuffing that are capable of being laundered without damage or compromise to the pad 22.

Also, in each of the aforementioned embodiments, it is envisioned that the body 12 may further comprise at least one pillow element 24. The pillow element(s) 24 may be separate units or integral to the body 12. The aforementioned embodiments may include a combination of the cushioning pad 22 and pillow element(s) 24. Thus, the pillow element(s) 24 may be integral to the cushioning pad 22 as well. It is envisioned that the pillow element(s) 24 is oriented into a position approximating the position of the user's head during sleep. It is further envisioned that another pillow element 24 may be oriented into a position approximating the position of the user's calves and ankles (when lying in a prone position). Thus, one embodiment calls for two pillow elements 24 oriented at ends 14 and 16, respectively, to accommodate the user's head and calves/ankles. It is envisioned that the pillow element(s) 24 may be fabricated from the same materials as indicated above in regard to the cushioning pad 22, and further including the use of feathers, corn husks, and other suitable substitutes available for use in commercially available pillows.

Furthermore, it is envisioned that means for controlling the softness and firmness of the bed 10 may be integrated into the body 12 so that the user may adjust the bed 10 accordingly. Similarly, a means for controlling the softness and firmness of the pillow element(s) 24 may be provided in much the same manner.

What is claimed is:

1. A bed for two adjacent seats separated by a gap, the bed comprising:
   a body traversing the gap between the seats;
   means for placing the bed in a position relative to the seats;
   means for securing the body to at least one of the seats, securing means comprising at least one arm coupled to the body, the at least one arm selectively movable between a first position and a second position.

2. The bed of claim 1 further comprising a cushioning pad.

3. The bed of claim 1 further comprising a pillow.

4. A bed for two adjacent seats separated by a gap, the bed comprising:
   a body traversing the gap between the seats;
   means for placing the bed in a position relative to the seats; and
   means for securing the body to at least one of the seats, securing
   means comprising at least one returnably resilient band, wherein the at least one band is secured about the seat.

5. The bed of claim 4, wherein the at least one band comprises a first end coupled to a second end.

6. A bed for a vehicle, the vehicle having two adjacent seats separated from each other so that a gap is defined therebetween, the bed comprising:
   a body comprising a first end disposed on one of the seats and a second end disposed on the other seat, wherein the body traverses the gap defined between the seats;
   means for placing the bed relative to the seats; and
   means for securing the body to at least one of the seats, securing means comprising at least one arm coupled to the body, the at least one arm selectively movable between a first position and a second position.

7. The bed of claim 6 further comprising a cushioning pad.

8. The bed of claim 6 further comprising a pillow element.

9. A bed for a vehicle, the vehicle having two adjacent seats separated from each other so that a gap is defined therebetween, the bed comprising:
   a body comprising a first end disposed on one of the seats and a second end disposed on the other seat, wherein the body traverses the gap defined between the seats;
   means for placing the bed relative to the seats; and
   means for securing the body to at least one of the seats, securing means comprising at least one returnably resilient band, wherein the at least one band is secured about the seat.

10. The bed of claim 9, wherein the at least one band comprises a first end coupled to a second end.

11. A bed for a vehicle, the vehicle having two adjacent seats separated from each other so that a gap is defined therebetween, the bed comprising:
    a body comprising a first end disposed on one of the seats and a second end disposed on the other seat, wherein the body bridges the gap defined between the seats; and
    a nose disposed between the first end and the second end, the nose placed between the seats.

12. The bed of claim 11 further comprising a cushioning pad.

13. The bed of claim 11 further comprising a pillow.

14. The bed of claim 11, further comprising means for securing the body to at least one of the seats.

15. The bed of claim 14, wherein the means comprises at least one arm coupled to the nose, the at least one arm selectively movable between a first position and a second position.

16. The bed of claim 14, wherein the means comprises at least one returnably resilient band, wherein the at least one band is secured about the back of the seat.

17. The bed of claim 16, wherein the at least one band comprises a first end coupled to a second end.

* * * * *